April 25, 1933.  O. H. BLACKWOOD ET AL  1,905,135

HUMIDIFYING APPARATUS

Filed July 23, 1928  2 Sheets-Sheet 2

INVENTOR.
Oswald H. Blackwood &
Lester F. Boss.
BY Jesse P. Langley
ATTORNEY

Patented Apr. 25, 1933

1,905,135

UNITED STATES PATENT OFFICE

OSWALD H. BLACKWOOD, OF PITTSBURGH, PENNSYLVANIA, AND LESTER F. BOSS, OF WOODS HOLE, MASSACHUSETTS, ASSIGNORS TO THE KOPPERS COMPANY OF DELAWARE, A CORPORATION OF DELAWARE

HUMIDIFYING APPARATUS

Application filed July 23, 1928. Serial No. 294,786.

Our invention relates to humidifiers and more especially to humidifiers for the atmosphere of inhabited rooms, such, for example, as a dwelling house.

Our invention has for objects the provision of apparatus suitable for the purpose above set forth, and, in particular, the provision of means for controlling and regulating the supply of water thereto that shall be free of frequent stoppages and other disadvantages of the devices of the prior art.

It is well known that during the winter houses and offices in the northern part of the United States are usually maintained at a temperature of 70° F. or above. The result is that the humidity of the air is very low, approaching a desert humidity in dryness. While the outside air may have a humidity of 60% or 80%, when this air is heated to the usual house temperature the humidity is decreased due to the heating of the air because, for the same absolute amount of water per unit volume of air, the percentage of moisture decreases with the temperature.

The high temperatures and low humidities at which the American people maintain their houses are becoming to be recognized as seriously prejudicial to health. Various devices have been suggested to overcome this condition and supply moisture to the air, but such devices have usually been virtually valueless because they have not supplied a sufficient amount of moisture.

Such devices as water pans in furnaces and water pans on radiators do not supply enough moisture, because in order to maintain the atmosphere in an eight or ten-room dwelling house at a proper humidity in cold weather, several gallons of water should be evaporated per day. With the increased use of hot water or steam radiators for house heating, the problem is particularly difficult because there is no central supply of air as in the case of a hot-air furnace which may be humidified and because pans or tanks of water placed on the radiators are ineffective and usually forgotten.

Our humidifier is particularly designed to be put into houses having the heating plants already installed and will convert the extremely dry air of the ordinary house into properly humidified air.

In humidifiers of this type for the purpose above stated, it has been found by experience that only a very small flow of water is required to maintain the average eight or ten-room dwelling house at a suitable and comfortable humidity—for example, of about 40 to 60%—and at a temperature of about 70° F. For example, such a humidifier may ordinarily be regulated to evaporate from about two gallons to six gallons of water in twenty-four hours.

It will be apparent that the above water requirement is very small and that the rate of flow for the water so continuously supplied to the humidifier is very small indeed. For example, a continuous drip valve might be regulated to give a small drip of, for example, from about 50 to 100 drops of water per minute.

In prior devices, small needle valves have generally been employed to regulate the flow of water, such needle valves being continuous in action, and it has been found that water supplied from the usual sources contains sufficient amounts of entrained or dissolved substances to impair the regulation and action of valves of this type regulated to give a water flow of the required small amount.

For example, it has been found in many instances that a needle valve so adjusted as to give a constant flow of only from 50 to 100 drops of water per minute is almost invariably entirely plugged up and thus impaired after a day's continuous operation or even less. This fact has been one of the principal objections to the wide-spread adoption of humidifiers of this type.

We have found that this objection may be overcome by supplying the requisite amount of water to a humidifier from an intermittently-operated valve mechanism by reason of the fact that the flow of water during the actual periods when the valve is open is large enough to prevent the deposition of entrained or dissolved matter carried by the water.

Furthermore, we provide a valve for humidifiers of the class described which is automatic in operation in that it is so constituted as to deliver a predetermined amount of liquid at each operation and also to maintain a predetermined and regulable average level of water within a receptacle from which the water is to be evaporated for humidifying purposes.

Our invention further contemplates the provision of means for wholly or partially preventing the deposition of insolubles in the receptacle from which the water is evaporated. Such means consists briefly in a device for removing portions of the contents of said receptacle in order to inhibit undue concentrations of dissolved material within the same.

In order that our invention may be clearly set forth and understood, we now describe with reference to the accompanying drawings the preferred manner in which it is embodied. In these drawings, Figure 1 is a vertical sectional view of a humidifier constructed in accordance with the present invention;

Similar numerals designate similar parts in each of the views of the drawings.

Figures 1, 2:
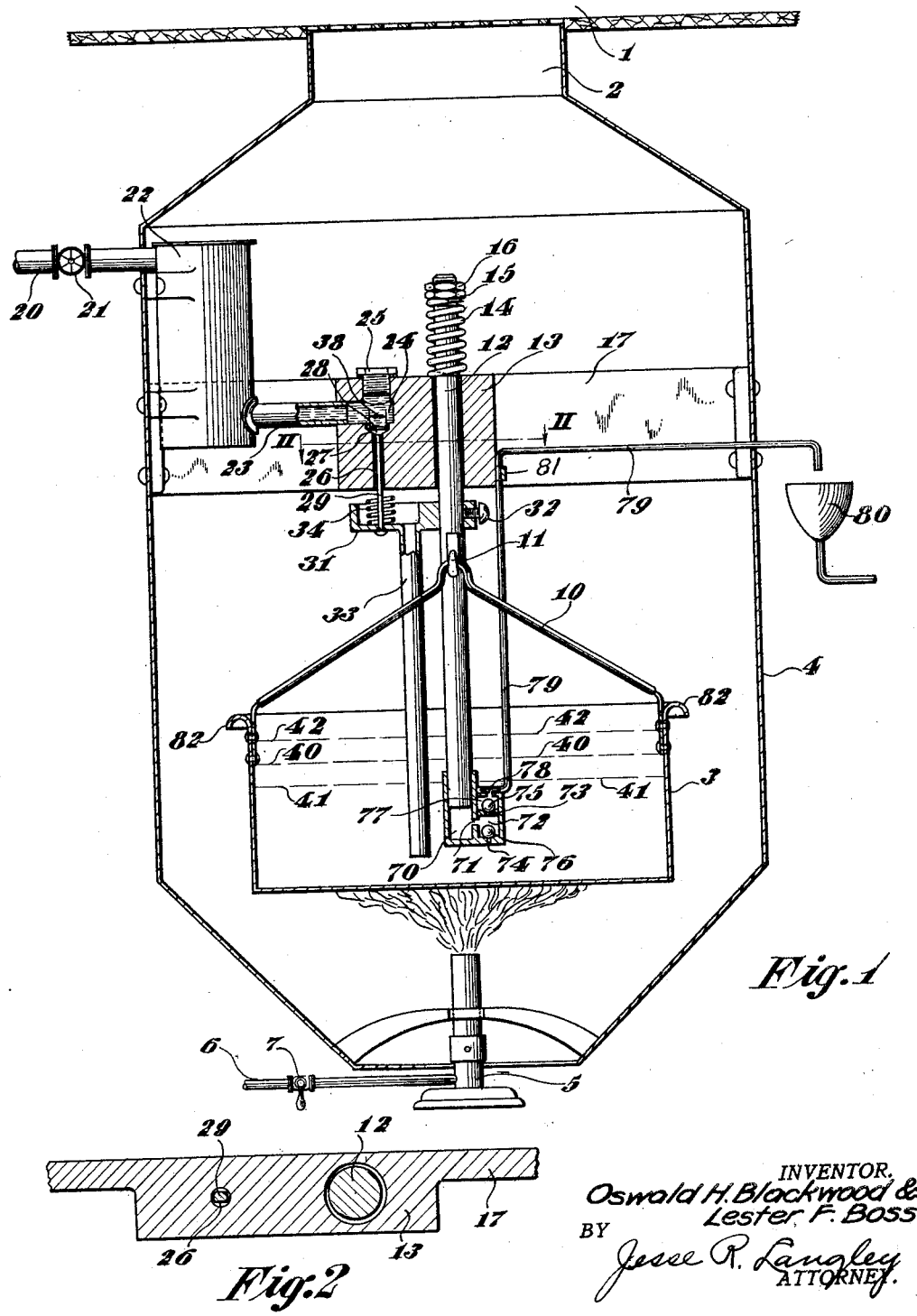
Fig. 2 is an enlarged horizontal sectional view, taken along the line 2—2 of Fig. 1.

Referring to the drawings, and more particularly to Fig. 1, moisture in vapor form is supplied to a room or other enclosure 1 through a suitable duct 2 from a receptacle 3 that is enclosed within a casing 4 that communicates with the duct 2. The receptacle 3 is provided with means for heating the contents thereof which, in the present instance, consists of a gas burner 5 that is connected to a gas supply conduit 6, provided with a valve 7.

By means of the valve 7, the quantity of gas supplied to the burner 5 is regulated to provide an evaporation of water from the receptacle 3 adequate to humidify the enclosure 1. The householder or other occupant of the enclosure 1 may adjust the regulation in accordance with his individual requirements of comfort and may be guided by any suitable device for determining the humidity of the enclosure 1.

The receptacle 3 is suspended by means of a bail 10 and a hook 11 from a rod 12, mounted for free vertical movement in a block 13 and supported thereon by means of a spring 14. The compression of the spring 14 may be adjusted by means of a nut 15 and lock nut 16 screwed on the upper end of the rod 12.

The block 13 is supported by means of a plate 17 that is conveniently mounted on the sides of the casing 4.

Water is supplied to the humidifier through a conduit 20 having a valve 21 and leading from a suitable source of pressure, to a filter 22 that is filled with cotton wool or other means for removing relatively large entrained matter from the water passing therethrough. Water passes from the filter 22 through a conduit 23 to a chamber 24 within the block 13. The chamber 24 is provided with a plug 25 that may be removed for purposes of inspection or cleaning.

The chamber 24 is also provided with an outlet conduit 26, extending vertically through the block 13 and which is in turn provided with a conical valve seat 27 at the juncture of the conduit 26 and the chamber 24. A valve head 28 conforming with the valve seat 27 is provided at the upper end of the valve stem 29 somewhat smaller in diameter than the conduit 26 and situated therein.

The valve stem 29 is secured at its lower end to a cup 31 that is mounted by means of a fastening 32 upon a rod 12 and which communicates through a conduit 33 with the interior of the receptacle 3. A small spring 34 is conveniently placed in the cup 31 around the lower end of the valve stem 29 to prevent splashing of water out of the cup 31.

The intermittent operation of this device may best be understood by a consideration of the forces involved. It is apparent that, in the position shown in Fig. 1,—that is, when the valve head 28 is seated upon the valve seat 27—the forces tending to keep the valve closed are as follows:

First, the weight of the receptacle 3, rod 12, cup 31 and other apparatus suspended from the spring 14. Second, the weight of the water within the receptacle 3 and, third, a force exerted by the pressure of the water within the chamber 24 and which is equal to the product of the water pressure—for example in pounds per square inch—and the effective area of the valve head 28, for example, in square inches. For purposes of illustration, this area is shown on the drawings by indicating at 38 a corresponding diameter of the circular area involved. On the other hand, the force tending to unseat the valve head 28 is entirely due to the reaction of the spring 14, which may be regulated, as above stated, by means of the nuts 15 and 16.

It may be assumed that the valve head 28 is seated and that the water level corresponds to the line 40—40. As the heat from the burner 5 evaporates water from the receptacle 3, the level of the water will fall until it reaches the line 41—41 which represents the minimum water level corresponding to a given seating of the spring 14. At this minimum level, the forces are momentarily in equilibrium. That is to say, the force of the spring 14 is just sufficient to overcome the various forces tending to keep the valve head 28 seated. The force of the spring 14 then causes the rod 12, receptacle 3, and valve head 28 to rise.

As soon as the valve head 28 is lifted off the valve seat 27, it will be apparent that the pressure tending to seat the valve head 28 is immediately reduced to a force which is the product of the water pressure within the chamber 24 and the horizontal cross-sectional area of the valve stem 29. This sudden decrease of one of the forces tending to keep the valve head 28 closed causes the reactions to be thrown out of equilibrium and the valve head 28 will not be reseated until sufficient water is admitted through the conduits 26 and 33 to the receptacle 3 to fill the latter to a point corresponding to the line 42—42, which represents the maximum water level for the seating of the spring 14 corresponding to the minimum water level indicated by the line 41—41.

When the water level reaches the line 42—42, the forces again pass through an equilibrium state and immediately thereafter the downward forces are sufficient to seat the valve head 28. When the valve head 28 seats, the effective water pressure tending to keep it closed immediately increases and becomes sufficient in amount to keep the valve head 28 closed until the water level falls to the minimum point indicated by the line 41—41, at which time the valve head 28 will again be unseated and the receptacle 3 refilled.

It follows, from the above considerations, that the amount of water admitted periodically to the receptacle 3 in pounds is equal to the water pressure in the chamber 24 in pounds per square inch times the difference between the horizontal area 38 (which represents the effective area of the valve head 28), and the smaller horizontal cross-sectional area of the valve stem 29 in square inches.

For example, assuming that a water pressure of 50 pounds per square inch is available, the horizontal area 38 of the valve head 28 is 0.02 square inch and the horizontal cross-sectional area of the valve stem 29 is 0.01 square inch. The total amount of water delivered to the receptacle 3 during one operation or shot will be $50 \times (0.02 - 0.01) = 0.5$ pound.

By adjusting the nuts 15 and 16 and thus changing the setting of the spring 14, the average amount of water contained by the receptacle 3 may be varied but this will have no effect upon the amount of water delivered per operation to the receptacle 3.

It is apparent that, under normal conditions of water supply and in view of the relatively small difference between the horizontal cross-sectional areas of the conduit 26 and valve stem 29, the rate of flow through the channel thus provided, when the valve head 28 is unseated, is very high and consequently the opportunity for the deposition of small entrained or dissolved matter will be reduced to a negligible amount.

Figure 3:
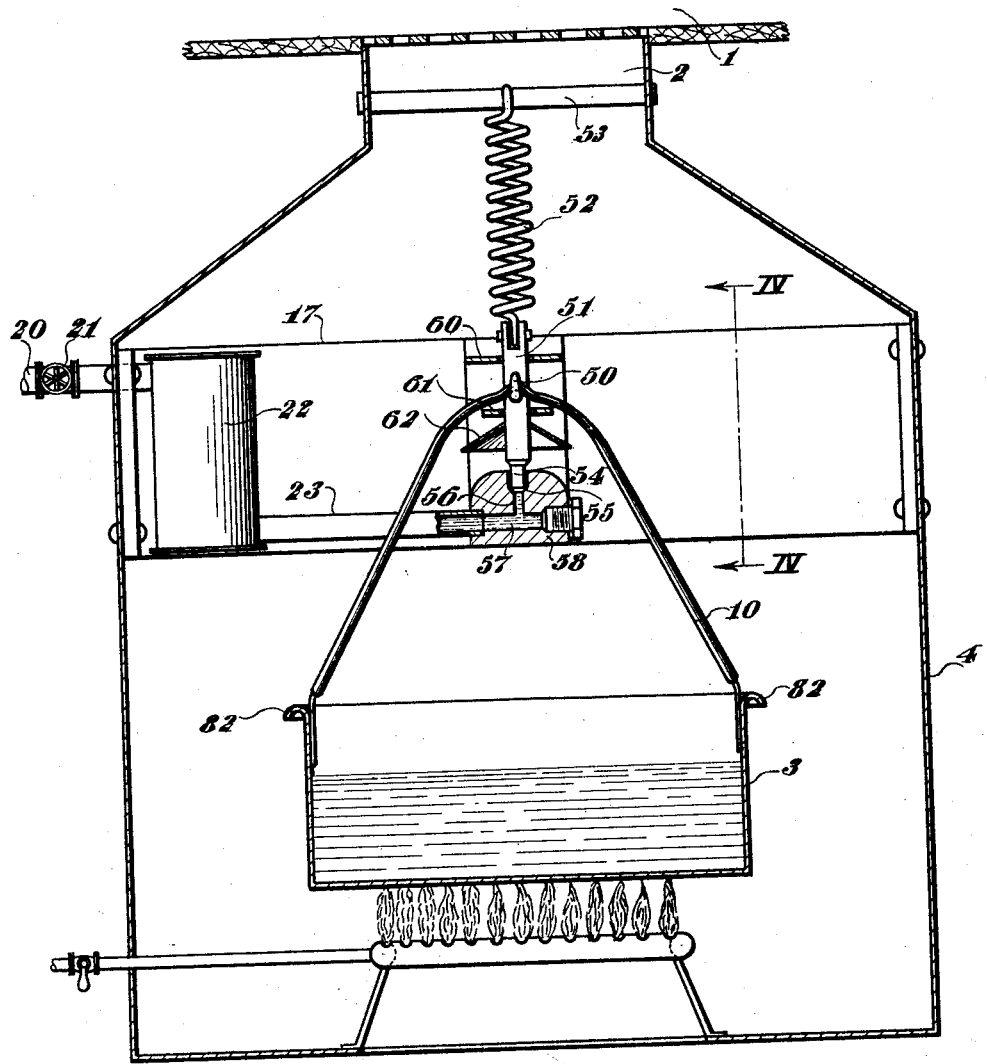
Fig. 3 is a vertical sectional view of an alternate form of humidifier.
Figure 4:
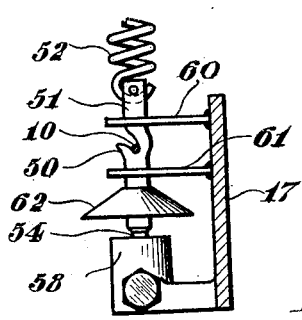
Fig. 4 is a vertical sectional view, taken on the line 4—4 of Fig. 3.

A somewhat different modification of our invention is illustrated in Figs. 3 and 4. In this instance, the receptacle 3 is suspended by means of the bail 10 and a hook 50 from a vertical pin 51 that is in turn suspended by a spring 52 from a lateral support 53. The pin 51 terminates at its lower end in a conical valve member 54, resting upon a valve seat 55 in a conduit 56 which communicates with a chamber 57 within a fixed block 58. The chamber 57 is supplied with water, as in the previous instance, as illustrated in Fig. 1. In the present instance, the pin 51 is restrained from moving laterally by means of guides 60 and 61 that are attached to the support member 17. The pin 51 is also provided with an umbrella 62 for the purpose of deflecting water from the conduit 56 downward into the receptacle 3.

While the operation of the mechanism shown in Figs. 3 and 4 is different from that of the mechanism shown in Figs. 1 and 2, in that the former is adapted to continuously deliver a small flow of water to the receptacle 3, whereas the latter is, as has been shown, adapted to operate intermittently, nevertheless the continuous device is similar to the intermittent device in that it is unaffected by deposition of adventitious material or sediment carried by the water.

For example, should a deposit build up upon the valve seat 55, the valve stem 54 merely raises until a proper orifice opening is attained, and the level of the water in the receptacle 3 is substantially unaffected.

Moreover, certain advantageous and novel features are present in both the intermittent and continuous devices, as set forth in the claims hereinafter made.

With respect to the intermittent valve mechanism shown in Figs. 1 and 2, there is provided a device for removing small amounts of water from the receptacle 3, and thus materially reducing the tendency of dissolved materials to precipitate out of the water in the receptacle 3 under evaporation of the water.

This device takes advatnage of the relative movement of the rod 12 and the block 13, and consists of a cylinder 70, slidably fitted over the lower end of the rod 12, so that the rod 12 serves as a piston therefor, and below the minimum water level 41—41 in the receptacle 3. The interior of the cylinder 70 communicates through a port 71 with a chamber 72 adjacent thereto, that is in turn provided with ports 73 and 74 in the upper and lower walls thereof, respectively.

The ports 73 and 74 are adapted to receive a corresponding pair of ball valves 75 and 76, respectively, that are seated by gravity and the lower port 74 and the ball valve 75 control communication between the chamber 72 and the water within the receptacle 3, and the upper port 73 and the ball valve 75 control communication between the chamber 72 and an adjacent chamber 77. The chamber 77 communicates through a port 78 with a conduit 79 that is affixed to the block 13, and serves as a support for the cylinder 70.

It will be apparent that the position of the cylinder 70 is in fixed relation to the block 13, and as the rod 12 rises and falls, it moves correspondingly in the cylinder 70. It will further be apparent that the ball valves 75 and 76 prevent downward flow through the ports 73 and 74.

Consequently, as the rod 12 rises, water will be drawn from the receptacle 3 through port 74, chamber 72, and port 71 into the cylinder 70. When the rod 12 subsequently falls, a portion or all of this water is forced through port 71, chamber 72, port 73, chamber 77 and port 78 into the conduit 79. The conduit 79 discharges into any convenient drain 80.

The effect of the reciprocating movement of the rod 12 is thus to pump a small amount of water out of the receptacle 3, and to exert an at least partially inhibitory effect upon the concentration and precipitation of solids within the receptacle 3. The relative position of the block 13 and the cylinder 70 may be regulated by means of a fastening 81, adapted to allow vertical adjustment of the pipe 79 and cylinder 70, and in this manner the amount of water removed from the receptacle 3 is also under regulable control.

The effect of this device is enhanced by regulating the evaporation from the receptacle 3 to give a more or less definite ebullition. Under such conditions, small amounts of water are caused to be thrown off from the water surface, and many of these fall out of the receptacle 3, and assist in preventing the deposition of solids within the receptacle 3.

In order to prevent encrustation of solids on the outside of the receptacle 3, under these conditions, the receptacle 3 is preferably provided with a lip 82, curved in such manner that liquid dropping therefrom will not traverse the sides of the receptacle 3.

It will be noted that our invention provides a humidifier that is adapted for humidifying the air in dwelling houses and the like and in which only small quantities of water vapor are released. Our invention further provides a valve for regulating and controlling the amount of water supplied to such a humidifier which is positive in action and which is not subject to accidental impairment or stoppage by reason of deposits of entrained or dissolved matter contained by the water supplied to the humidifier.

We claim as our invention:

1. A humidifier comprising, in combination, a water supply conduit, a valve therein, an evaporating receptacle positioned to receive water from said conduit, means for intermittently removing small amounts of water from said receptacle, and means for heating said receptacle.

2. A humidifier comprising, in combination, a water supply conduit, a filter therein, a valve therein, an evaporating receptacle positioned to receive water from said conduit, means for intermittently removing small amounts of water from said receptacle, and means for heating said receptacle.

3. In a humidifier, a receptacle adapted to receive liquid for evaporation thereof and adapted to move intermittently according to the weight of liquid contained therein, and a pump located in said receptacle and operated by said movement to discharge small quantities of liquid therefrom.

4. A humidifier comprising a casing, means for supplying hot gases to the interior of said casing, a receptacle within said casing adapted to receive liquid, means for passing hot gases through said casing, a conduit for conveying liquid from a source of pressure to said receptacle, a valve in said conduit for regulating the flow of liquid therethrough, and a filter for said liquid located within said casing exposed to said hot gases and in said conduit at a point between said source of pressure and said valve.

5. A humidifier which comprises, in combination, a conduit for supplying water from a source thereof under pressure and having a valve device for controlling the flow of liquid therethrough, which valve device comprises a valve seat and a valve head therefor located between said valve seat and the source of liquid, a receptacle adapted to receive water from said conduit and adapted to exert a force tending to seat said valve head, flexible means adapted to exert an opposite force, and means for heating said receptacle, the hydraulic pressure tending to seat said valve being substantially greater when said valve is closed than when said valve is open, said valve thus being caused to operate to supply liquid in intermittent flows at high velocity to said receptacle to replenish the same against substantially uniform and continuous losses by evaporation therefrom.

In testimony whereof, we have hereunto subscribed our names this 20th day of July, 1928, and this 16 day of July, 1928, respectively.

OSWALD H. BLACKWOOD.
LESTER F. BOSS.